United States Patent
Sun et al.

(10) Patent No.: US 7,295,616 B2
(45) Date of Patent: Nov. 13, 2007

(54) METHOD AND SYSTEM FOR VIDEO FILTERING WITH JOINT MOTION AND NOISE ESTIMATION

(75) Inventors: Zhaohui Sun, Rochester, NY (US); Gabriel Fielding, Webster, NY (US); Majid Rabbani, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 914 days.

(21) Appl. No.: 10/715,039

(22) Filed: Nov. 17, 2003

(65) Prior Publication Data

US 2005/0105627 A1    May 19, 2005

(51) Int. Cl.
*H04N 7/12* (2006.01)
(52) U.S. Cl. .............................. 375/240.27; 375/240.29
(58) Field of Classification Search ........... 375/240.01, 375/240.12, 240.27, 240.29; H04N 7/12
See application file for complete search history.

(56) References Cited

U.S. PATENT DOCUMENTS

| | | | |
|---|---|---|---|
| 5,384,865 A | 1/1995 | Loveridge | 382/54 |
| 5,600,731 A | 2/1997 | Sezan et al. | 382/107 |
| 5,764,307 A | 6/1998 | Ozcelik et al. | 348/608 |
| 5,909,515 A | 6/1999 | Makram-Ebeid | 382/260 |
| 6,281,942 B1 | 8/2001 | Wang | 348/607 |
| 6,535,254 B1 | 3/2003 | Olsson et al. | 348/607 |
| 2002/0109788 A1 | 8/2002 | Mortion et al. | 348/625 |

FOREIGN PATENT DOCUMENTS

| | | |
|---|---|---|
| EP | 0 840 514 A1 | 6/1998 |
| EP | 0 614 312 B1 | 6/1999 |
| WO | WO 94/09592 | 4/1994 |
| WO | WO 01/97509 A1 | 12/2001 |

OTHER PUBLICATIONS

"Noise reduction in image sequenced using motion-compensated temporal filtering" by E. Dubois and M. Sabri. *IEEE Trans. on Communciation*, 32(7):826-831, 1984.
"Noise reduction filters for dynamic image sequence: a review" by J.C. Brailean et al. *Proceedings of the IEEE*, 83(9):1272-1292, Sep. 1995.
"The robust estimation of multiple motions: parametric and piecewise smooth flow fields" by M. Black and P. Anandan. *Computer Vision and Image Understanding*, 63:75-104, Jan. 1996.

*Primary Examiner*—Young Lee
(74) *Attorney, Agent, or Firm*—Robert L. Walker

(57) ABSTRACT

A method for video filtering of an input video sequence by utilizing joint motion and noise estimation includes the steps of: (a) generating a motion-compensated video sequence from the input video sequence and a plurality of estimated motion fields; (b) spatiotemporally filtering the motion compensated video sequence, thereby producing a filtered, motion-compensated video sequence; (c) estimating a standard deviation from the difference between the input video sequence and the filtered, motion-compensated video sequence, thereby producing an estimated standard deviation; (d) estimating a scale factor from the difference between the input video sequence and the motion compensated video sequence; and (e) iterating through steps (a) to (d) using the scale factor previously obtained from step (d) to generate the motion-compensated video sequence in step (a) and using the estimated standard deviation previously obtained from step (c) to perform the filtering in step (b) until the value of the noise level approaches the unknown noise of the input video sequence, whereby the noise level is then characterized by a finally determined scale factor and standard deviation.

18 Claims, 5 Drawing Sheets

METHOD AND SYSTEM FOR VIDEO FILTERING WITH JOINT MOTION AND NOISE ESTIMATION

FIELD OF THE INVENTION

The invention relates generally to the field of digital video and image sequence processing, and in particular to video filtering and noise reduction in a video image sequence.

BACKGROUND OF THE INVENTION

With the advance of digital technologies, especially the widespread use and availability of digital camcorders, digital video is getting easier and more efficient to use in a wide variety of applications, such as entertainment, education, medicine, security, and military. Accordingly, there is an increasing demand for video processing techniques, such as noise reduction.

There is always certain level of noise captured in a video sequence. The sources are numerous, including electronic noise, photon noise, film grain noise, and quantization noise. The noise adversely affects video representation, storage, display, and transmission. It contaminates visual quality, decreases coding efficiency (with increased entropy), increases transmission bandwidth, and makes content description less discriminative and effective. Therefore, it is desirable to reduce the noise while preserving video content.

After years of effort, video filtering still remains as a challenging task. Most of the time, the only information available is the input noisy video. Neither the noise-free video nor the error characteristics are available. To effectively reduce the random noise, motion estimation is necessary to enhance temporal correlation, by establishing point correspondence between video frames. However, motion estimation itself is an under-constrained and ill-posed problem, especially when there is noise involved. Perfect motion estimation is almost impossible or not practical. Meanwhile, spatiotemporal filtering is also necessary to actually reduce the random noise. The filter design heavily depends on the knowledge of the noise characteristics (which are usually not available). Furthermore, video processing requires tremendous computational power because of the amount of data involved.

Research on noise estimation and reduction in a video sequence has been going on for decades. "Noise reduction in image sequence using motion-compensated temporal filtering" by E. Dubois and M. Sabri, IEEE Trans. on Communication, 32(7):826-831, 1984, presented one of the earliest schemes using motion for noise reduction. A comprehensive review of various methods is available in "Noise reduction filters for dynamic image sequence: a review" by J. C. Brailean, et al., Proceedings of the IEEE, 83(9):1272–1292, September 1995. A robust motion estimation algorithm is presented in "The robust estimation of multiple motions: parametric and piecewise smooth flow fields" by M. Black and P. Anandan, Computer Vision and Image Understanding, 63:75-104, January 1996.

In addition, the following patent publications bear some relevance to this area; each of which are incorporated herein by reference. Commonly-assigned U.S. Published Patent Application No. 20020109788, "Method and system for motion image digital processing" by R. Morton et al., discloses a method to reduce film grain noise in digital motion signals by using a frame averaging technique. A configuration of successive motion estimation and noise removal is employed. U.S. Pat. No. 6,535,254, "Method and device for noise reduction" to K. Olsson et al., discloses a method of reducing noise in a video signal. U.S. Pat. No. 6,281,942, "Spatial and temporal filtering mechanism for digital motion video signals" to A. Wang, discloses a digital motion video processing mechanism of adaptive spatial filtering followed by temporal filtering of video frames. U.S. Pat. No. 5,909,515, "Method for the temporal filtering of the noise in an image of a sequence of digital images, and device for carrying out the method" to S. Makram-Ebeid, discloses a method for temporal filtering of a digital image sequence. Separate motion and filtering steps were taken in a batch mode to reduce noise. U.S. Pat. No. 5,764,307, "Method and apparatus for spatially adaptive filtering for video encoding" to T. Ozcelik et al., discloses a method and an apparatus for spatially adaptive filtering a displaced frame difference and reducing the amount of information that must be encoded by a video encoder without substantially degrading the decoded video sequence. The filtering is carried out in the spatial domain on the displaced frames (the motion compensated frames). The goal is to facilitate video coding, so that the compressed video has reduced noise (and smoothed video content as well). U.S. Pat. No. 5,600,731, "Method for temporally adaptive filtering of frames of a noisy image sequence using motion estimation" to M. I. Sezan et al., discloses a temporally adaptive filtering method to reduce noise in an image sequence. Commonly-assigned U.S. Pat. No. 5,384,865, "Adaptive, hybrid median filter for temporal noise suppression" to J. Loveridge, discloses a temporal noise suppression scheme utilizing median filtering upon a time-varying sequence of images.

In addition, International Publication No. WO94/09592, "Three dimensional median and recursive filtering for video image enhancement" to S. Takemoto et al., discloses methods for video image enhancement by spatiotemporal filtering with or without motion estimation. International Publication No. WO01/97509, "Noise filtering an image sequence" to W. Bruls et al., discloses a method to filter an image sequence with the use of estimated noise characteristics. Published European Patent Application EP0840514, "Method and apparatus for prefiltering of video images" to M. Van Ackere et al., discloses a method for generating an updated video stream with reduced noise for video encoding applications. European Patent Specification EP0614312, "Noise reduction system using multi-frame motion estimation, outlier rejection and trajectory correction" to S.-L. Iu, discloses a noise reduction system.

One of the common features of the previously disclosed schemes is the use of independent and separate steps of motion estimation and spatiotemporal filtering. Motion estimation is taken as a preprocessing step in a separate module before filtering, and there is no interaction between the two modules. If the motion estimation fails, filtering is carried out on a collection of uncorrelated samples, and there is no way to recover from such a failure. Also there is no attempt to explicitly estimate the noise levels, leading to a high chance of mismatch between the noise in the video and the algorithms and the parameters used for noise reduction. Furthermore, a robust method has not been used in video filtering, and the performance suffers when the underlying model and assumptions are violated occasionally, which happens when that data is corrupted by noise.

SUMMARY OF THE INVENTION

It is an objective of this invention to provide a robust video filtering method to reduce random noise in a video sequence.

It is another objective of this invention to make the computational method robust to occasional model violations and outliers.

It is yet another objective of this invention to successively improve the performance of motion estimation, spatiotemporal filtering and noise estimation through iterations.

The present invention is directed to overcoming one or more of the problems set forth above. Briefly summarized, according to one aspect of the present invention, the invention resides in a method for video filtering of an input video sequence by utilizing joint motion and noise estimation, where the filtering is based on determining the noise level, as characterized by the standard deviation, of the input video sequence as corrupted by unknown noise. The method comprises the steps of: (a) generating a motion-compensated video sequence from the input video sequence and a plurality of estimated motion fields; (b) spatiotemporally filtering the motion compensated video sequence, thereby producing a filtered, motion-compensated video sequence; (c) estimating a standard deviation from the difference between the input video sequence and the filtered, motion-compensated video sequence, thereby producing an estimated standard deviation; (d) estimating a scale factor from the difference between the input video sequence and the motion compensated video sequence; and (e) iterating through steps (a) to (d) using the scale factor previously obtained from step (d) to generate the motion-compensated video sequence in step (a) and using the estimated standard deviation previously obtained from step (c) to perform the filtering in step (b) until the value of the noise level approaches the unknown noise of the input video sequence, whereby the noise level is then characterized by a finally determined scale factor and standard deviation.

The advantages of the invention include: (a) automatically reducing the random noise in a video sequence without the availability of noise-free reference video and without knowledge of the noise characteristics; (b) using joint motion and noise estimation to improve filtering performance through iterations in a closed loop; and (c) employing a robust method to alleviate the sensitivity of occasional model violation and outliers, in motion estimation, filter design and noise estimation.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
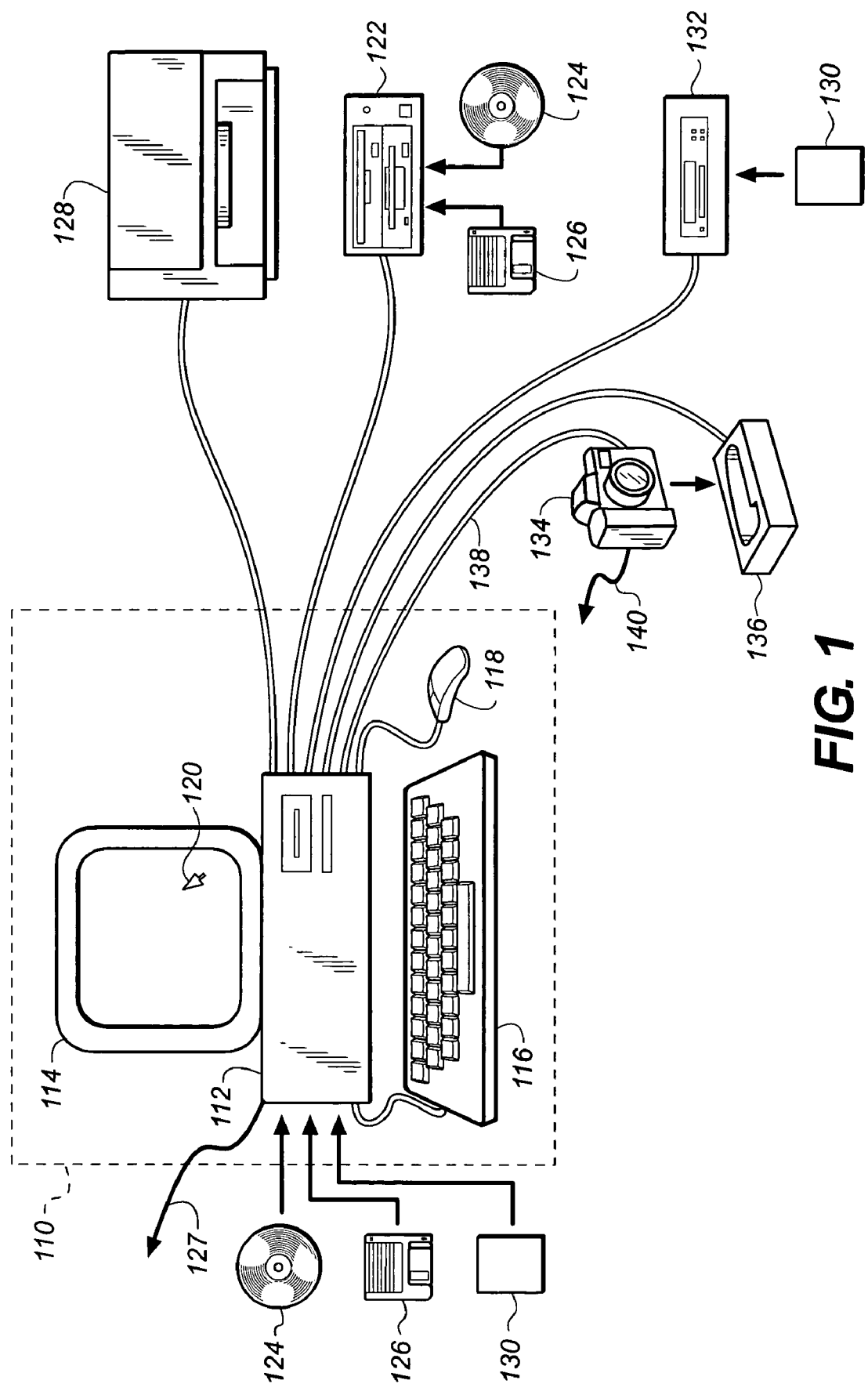
FIG. 1 generally illustrates features of a system in accordance with the present invention.

Before describing the present invention, it facilitates understanding to note that the present invention is preferably utilized on any well-known computer system, such as a personal computer. For instance, referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor-based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor-based unit for providing a means of inputting the software programs and other information to the microprocessor-based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images and videos may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images and videos stored in the PC card 130, the floppy disk 126 or the compact disk 124, or input through the network connection 127, may have been obtained from a variety of sources, such as a digital image or video capture device 134 (e.g., a digital camera) or a scanner (not shown). Images or video sequences may also be input directly from a digital image or video capture device 134 via a camera or camcorder docking port 136 connected to the microprocessor-based unit 112 or directly from the digital camera 134 via a cable connection 138 to the microprocessor-based unit 112 or via a wireless connection 140 to the microprocessor-based unit 112.

Figure 2:
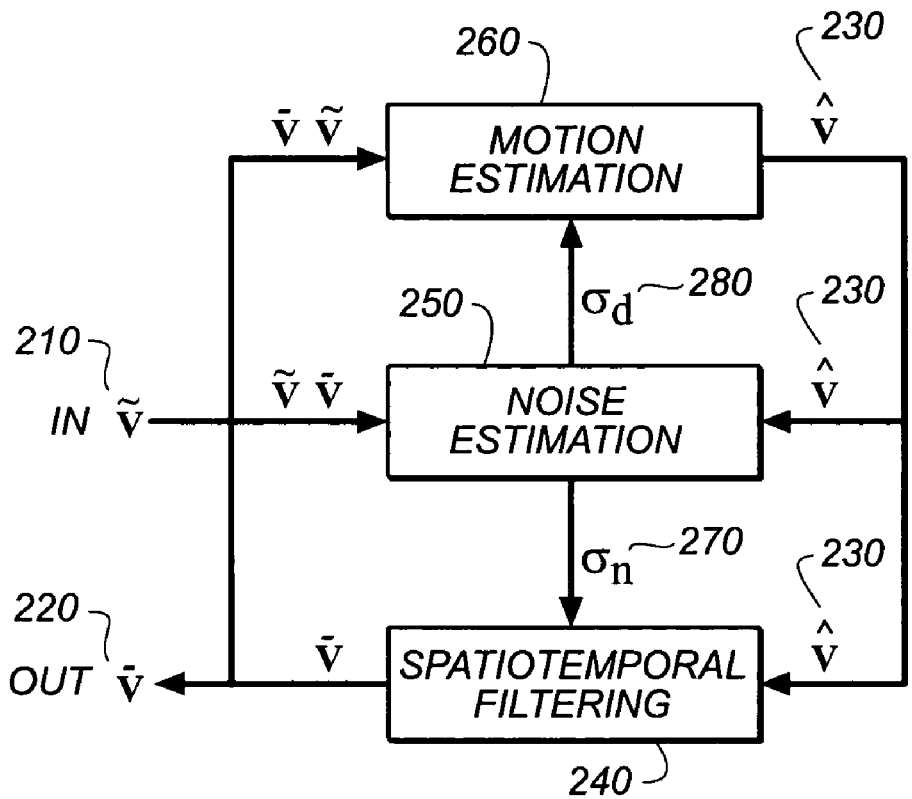
FIG. 2 shows a system diagram of video filtering with joint motion and noise estimation.

Referring now to FIG. 2, the system diagram of video filtering with joint motion and noise estimation is illustrated. A digital video sequence V={I(i,j,k), i=1 . . . M, j=1 . . . N, k=1 . . . K} is a temporally varying 2-D spatial signal I on frame k, sampled and quantized at spatial location (i,j). The observed input video sequence $\ddot{V}$ 210 is corrupted by additive random noise $\ddot{V}$=V+ϵ with ϵ following a Gaussian distribution N(0,$\sigma_n$). The output is a spatiotemporally filtered video $\overline{V}$ 220 with reduced noise, which is close to the noise-free video V. As the ground truth V is not available, three closely tied operations, that is, motion estimation 260, noise estimation 250 and spatiotemporal filtering 240, are carried out iteratively in a closed loop to successively improve video filtering performance. The motion estimation module 260 finds point trajectories across video frames, and therefore enhances temporal correlation. It takes the filtered video frames $\overline{V}$ as input and generates a plurality of dense motion fields between temporally adjacent frames $U_{ij}$(k, k+r) with r=−R, . . . , R. The module also generates the motion compensated video $\hat{V}$ 230 from the noisy input video $\ddot{V}$ and the plurality of estimated motion fields. The motion compensated video $\hat{V}$ is spatiotemporally filtered in the module 240 by adaptive weighted averaging to reduce the random noise, yielding the filtered video 220. Robust methods are employed in both motion estimation and spatiotemporal filtering, which use the noise characteristics for scale factor selection and filter design. To this end, an explicit noise estimation module 250 is introduced to decide the noise level in the input noisy video $\ddot{V}$ and the scale factors used for robust motion estimation.

As mentioned above, the observed input video sequence $\ddot{V}$ 210 is corrupted by additive random noise $\ddot{V}$=V+ϵ with ϵ following a Gaussian distribution N(0,$\sigma_n$). Given the additive degradation model $$\ddot{I}(i,j,k)=I(i,j,k)+\epsilon(i,j,k)$$

with ϵ(i,j,k) as the independent noise term, the noise level 270, measured by the standard deviation, can be estimated from the noisy input video sequence $\ddot{V}$ and the noise-free video V, as follows:

$$\sigma_n^2 = \frac{1}{KMN}\sum_{k=1}^{K}\sum_{m=1}^{M}\sum_{n=1}^{N}(\ddot{I}(i,j,k)-I(i,j,k))^2.$$

As the ground truth V is not available, we estimate the noise level $\sigma_n$ 270 from the difference between the observed input video sequence $\ddot{V}$ and the filtered video sequence $\overline{V}$ 220. The spatiotemporal filtering module 240 reduces the random noise in the motion compensated video $\hat{V}$ 230 and generates the filtered video $\overline{V}$. Noise estimation module 250 takes both $\ddot{V}$ and $\overline{V}$ as input and estimates the noise level, as characterized by the standard deviation $\sigma_n$ 270. The process is iterated in a closed-loop fashion as shown in FIG. 2, which is necessary because $\sigma_n$ estimated from $\ddot{V}$−$\overline{V}$ is in fact the noise reduction in one pass. The iterations successively improve the spatiotemporal filtering 240 and the noise estimation 250. As temporal correlation gets stronger from improved motion fields, it leads to better noise reduction in $\overline{V}$. As $\overline{V}$ gets closer to V, it in turn increases the accuracy of the noise and motion estimation.

Noise estimation module 250 also takes both $\ddot{V}$ and $\hat{V}$ as input and estimates the scale factor, as characterized by the scale factor $\sigma_d$ 280. (Generally speaking, as noise in $\ddot{V}$ increases, the scale factor function assigns bigger weights to more samples.) The process is iterated in a closed-loop fashion as shown in FIG. 2, which is necessary because estimated from $\ddot{V}$−$\hat{V}$ is in fact the scale factor in one pass. The iterations successively improve the motion estimation 260 and the noise estimation 250. As temporal correlation gets stronger from improved motion fields, it leads to a better scale factor in terms of $\hat{V}$. As $\hat{V}$ gets closer to V, it in turn increases the accuracy of the motion estimation. Consequently, and as shown in FIG. 2, the joint motion and noise estimation process is iterated in a closed-loop fashion to successively reduce the random noise and improve video filtering performance.

Figure 3:
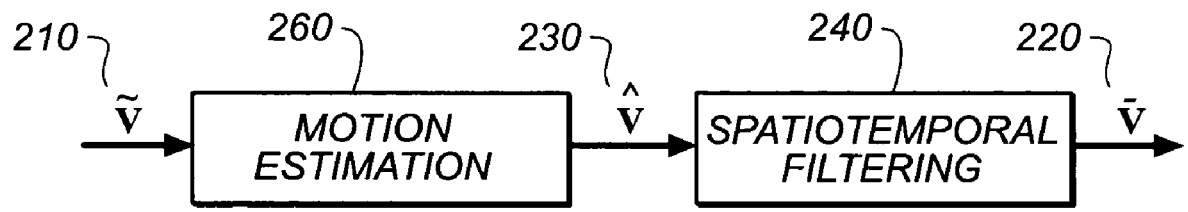
FIG. 3 shows the successive concatenation of motion estimation and spatiotemporal filtering.

The disclosed video filtering scheme is different from the previous video noise reduction schemes (shown in FIG. 3), which are based on the successive concatenation of motion estimation and spatiotemporal filtering. The previously disclosed schemes take two independent and separate steps, where motion estimation is taken as a preprocessing step, and there is no interaction between the two modules. Numerous motion estimation algorithms can be used, such as gradient-based, region-based, energy-based, and transform-based approaches. There are also a number of filters available, including Wiener filter, Sigma filter, median filter, and adaptive weighted average (AWA) filter. In fact, both motion estimation and spatiotemporal filtering are closely tied to the noise characteristics shown in FIG. 2. Joint motion and noise estimation potentially can improve the video filtering performance. Furthermore, a robust method becomes essential when noise is involved.

Figure 4:
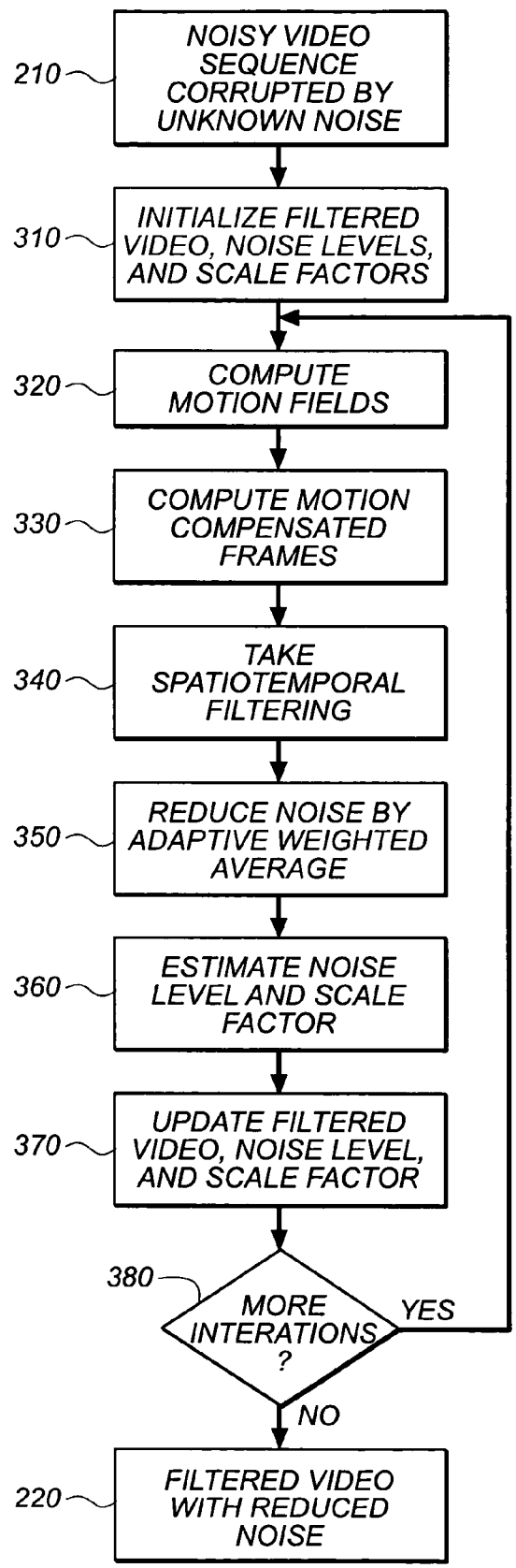
FIG. 4 shows a procedure for video filtering with joint motion and noise estimation.

The disclosed video filtering scheme can be summarized in a flow chart as presented in FIG. 4. The input is the noisy video sequence 210 corrupted by unknown noise, and the output is the filtered video sequence 220 with reduced noise, which is close to the noise-free video V. The first step 310 initializes the filtered video $\overline{V}$, the standard deviation $\sigma_n$ of the noise in $\ddot{V}$, and the scale factor $\sigma_d$. At a high signal to noise ratio (SNR), i.e. the noise level is relatively small compared to the signal, the filtered video is initialized as the input video $\ddot{V}$. At a low signal to noise ratio (SNR), i.e. the image quality is poor, $\nabla$ is initialized as the spatially filtered input video. The noise level in $\ddot{V}$ is used for filter design in the spatiotemporal filtering, and the scale factor $\sigma_d$ is used for robust motion estimation. After initialization, motion fields between temporally adjacent frames are computed in step 320 from the filtered video, and the recovered motion is used to generate the motion compensated video $\hat{V}$ from the noisy video $\ddot{V}$ in step 330. Spatiotemporal filtering is carried out in step 340 to reduce the random noise, by adaptive weighted averaging in step 350. The noise level used in spatiotemporal filtering and the scale factor used in motion estimation are estimated in step 360. The filtered video, noise level and scale factor are updated in step 370 for the next iteration, until the termination condition in step 380 is satisfied. The termination condition is that the change in $\nabla$ is small enough, i.e., smaller than some predetermined threshold, or that a predetermined number of iterations has been reached. More details of the individual modules of 260, 250 and 240 will be disclosed in the following.

Referring to the motion estimation module 260 in FIG. 2, motion estimation computes the motion fields between video frames. Let $$U_{ij}(k,k+r)=(u_{ij}(k,k+r),u_{ij}(k,k+r)), i=1\ldots M, j=1\ldots N, k=1\ldots K, r=-R\ldots R$$

denote the motion vector from pixel (i,j) in frame k to its correspondence in frame k+r. For each frame k, 2R temporally adjacent frames are also involved, requiring a total of RK dense motion fields (both forward and backward). The requirement can be reduced to 2K temporally adjacent $U_{ij}(k,k\pm 1)$, as the others can be computed following the chain rule, $$U_{ij}(k, k+r) = \sum_{l=k}^{k+r-1} U_{ij}(l, l+1) \text{ if } r > 0,$$

or $$U_{ij}(k, k+r) = \sum_{l=k}^{k+r+1} U_{ij}(l, l-1) \text{ if } r < 0.$$

As motion vectors are imperfect, the chain rule could accumulate motion errors and break the temporal correlation needed for the following filtering.

The recovery of motion vectors (u,v) from a pair of images solely based on image intensity I(i,j) is underconstrained and ill-posed. Even worse, the observed image frames are corrupted by unknown noise. A perfect motion and noise model is almost impossible or not practical. Therefore, a robust method plays an essential role to reduce the sensitivity of the violations of the underlying assumptions.

We use the robust motion estimation method by Black and Anandan to recover the motion field, which is done by minimizing the energy function $$E(u,v) = \sum_{i=1}^{M}\sum_{j=1}^{N}\left\{\lambda_d \rho_d\left(u_{ij}\frac{\partial I_{ij}}{\partial x} + v_{ij}\frac{\partial I_{ij}}{\partial y} + \frac{\partial I_{ij}}{\partial t}, \sigma_d\right) + \right.$$

-continued $$\left. \lambda_s \sum_{p,q \in S} \rho_s(u_{ij} - u_{i+p,j+q}, \sigma_s) + \lambda_s \sum_{p,q \in S} \rho_s(v_{ij} - v_{i+p,j+q}, \sigma_s)\right\},$$

where $\rho_d$ and $\rho_s$ are robust functions with scale parameters $\epsilon_d$ and $\sigma_s$, u and v are the horizontal and vertical motion components, and S is the 4-neighbor or 8-neighbor spatial support of pixel (i,j). The first term in the above equation enforces the constant brightness constraint, i.e., the points have the same appearance in both frames. The constraint can be approximated by optical flow equation $I_x u + I_y v + I_t = 0$ following Taylor expansion. The second term enforces the smoothness constraint such that the motion vectors vary smoothly. Coefficients $\lambda_d$ and $\lambda_s$ control the relative weights of the two constraints.

Figure 5B:
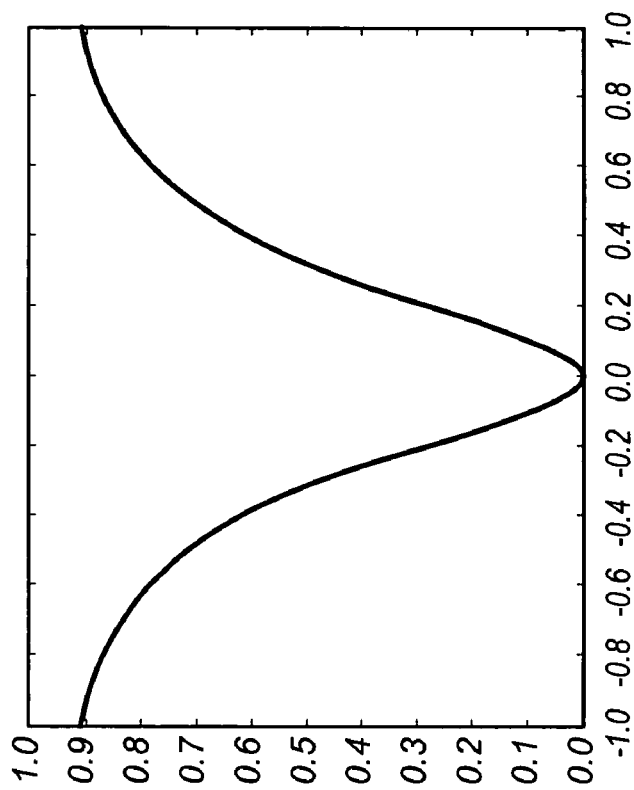
FIGS. 5A and 5B show respective plots of (a) a Lorentzian robust function, and (b) a Geman-McClure robust function at $\sigma=0.1$.
Figure 5A:
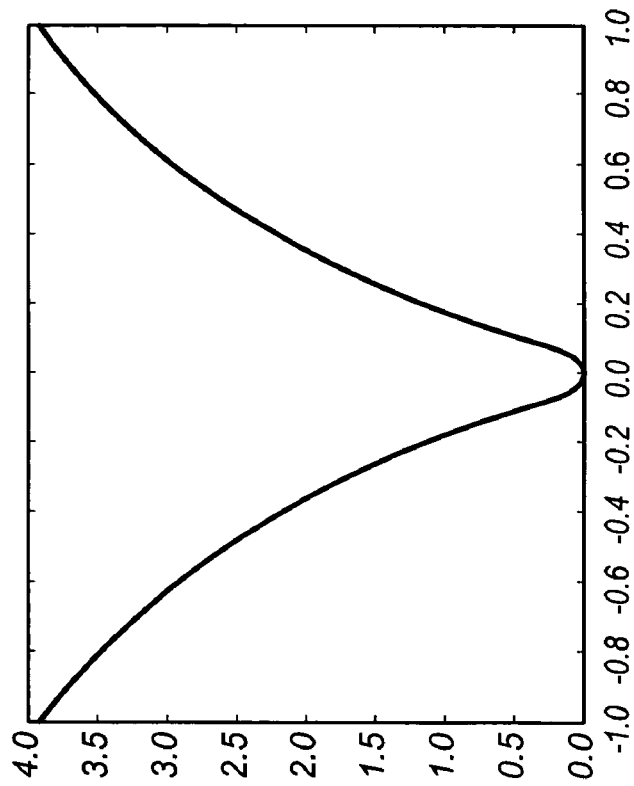

In a real dataset, especially corrupted by noise, the constraints may not be strictly satisfied at every point, due to scene changes, illumination changes, occlusions, and shadows. The occasional violations of the constant brightness and smoothness constraints can be alleviated by using a robust method and outlier rejection. Two robust functions for M-estimate are the Lorentzian function $$\rho_L(x, \sigma) = \log\left(1 + \frac{1}{2}\left(\frac{x}{\sigma}\right)^2\right)$$

and the Geman-McClure function $$\rho_G(x, \sigma) = \frac{x^2}{x^2 + \sigma},$$

as shown in FIG. 5. Unlike the linear and quadratic functions, robust functions assign smaller weights to the outliers. As x increases, the influence of an outlier tapers off. Of course, the choice of the scale factor $\sigma$ has direct impact on the performance, which decides the transition from inliers to the outliers, which will be decided by the noise estimation module 250.

As the noise-free video is not available, we use the filtered video $\nabla$, instead of the observed noisy video $\ddot{V}$, for motion estimation. Compared to $\ddot{V}$, $\nabla$ has reduced noise and smoother intensity surface, which helps the computation of gradients $I_x$, $I_y$, and $I_t$, yielding smoother and more consistent motion fields.

Referring to the spatiotemporal filtering module 240 in FIG. 2, the noisy video is filtered by adaptive weighted averaging to reduce the random noise, independent of the video structure. Given the recovered motion fields $U_{ij}(k,k+r)$, with $r=-R\ldots R$, the adjacent noisy frames are backward compensated to frame k $$\hat{I}_r(i,j,k) \Leftarrow \bar{I}(i+u_{ij}(k,k+r), j+v_{ij}(k,k+r), k+r)$$

Bilinear interpolation is carried out on the integer grid, which has a low-pass filtering effect.

The 2R+1 frames are then filtered by adaptive weighted average $$\bar{I}(i,j,k) = \frac{1}{z(i,j,k)} \sum_{(p,q,r) \in S} w_{ijk}(p,q,r)\hat{I}_r(i+p, j+q, k)$$

where $z(i,j,k)=\Sigma_{(p,q,r)\in S}w_{ijk}(p,q,r)$ is a normalization factor, and S defines a 3-D spatiotemporal neighborhood. As $\hat{V}$ has enhanced temporal correlation, the weighted average can reduce the random noise, which is independent of the signal.

Figure 6:
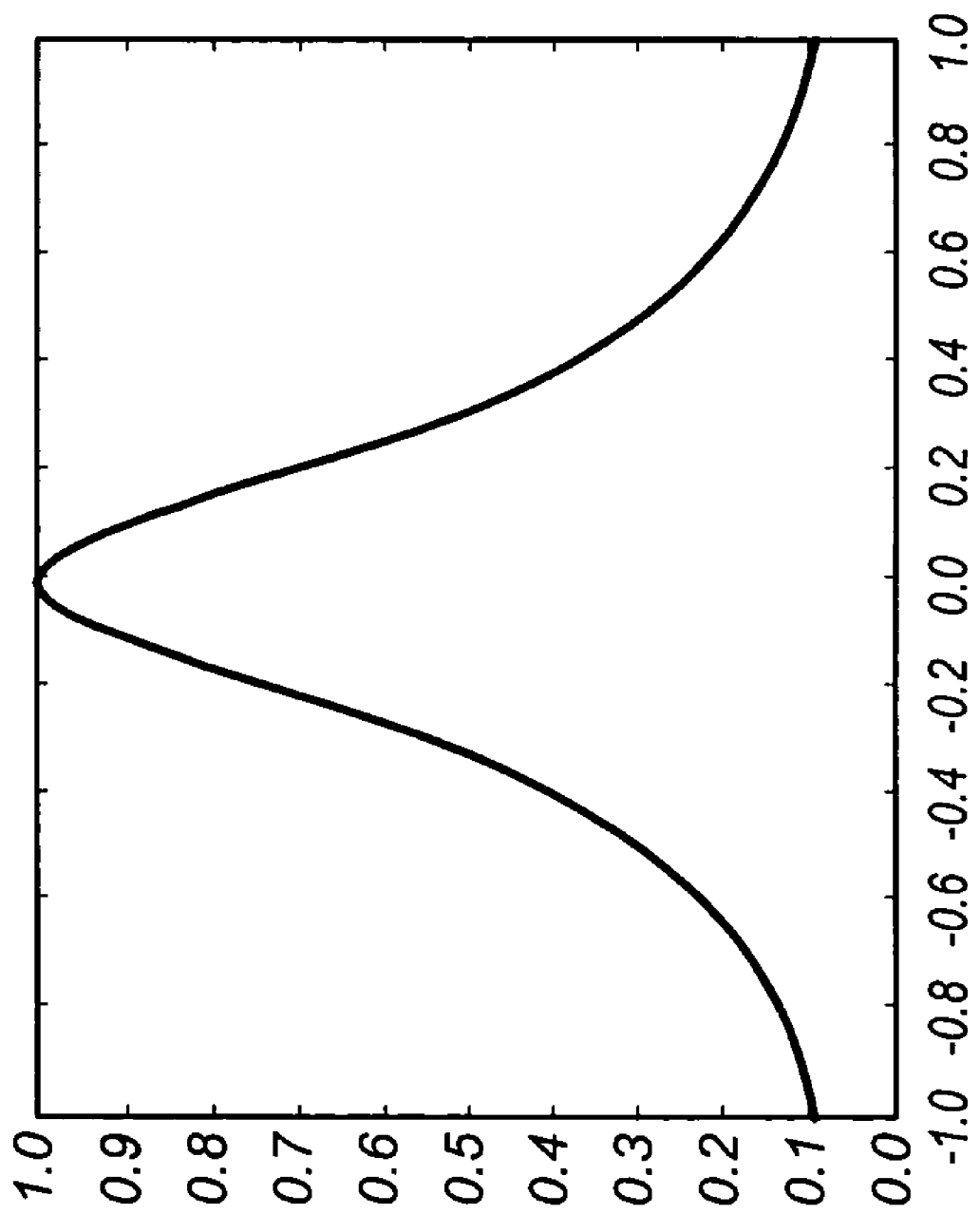
FIG. 6 shows a plot of an adaptive averaging filter.

The filter is designed as $$w_{ijk}(p,q,r)=1-\rho_G(\hat{I}_{pqr}(i,j,k)-\bar{I}(i,j,k),\tau).$$

where $$\rho_G(x,\sigma) = \frac{x^2}{x^2+\sigma}$$

is the Geman-McClure robust function shown in FIG. 5(b). The filter, as shown in FIG. 6, has a bell shape and tapers off as the intensity discrepancy increases. Other filters are also available for the filtering purpose, such as the Wiener filter, Sigma filter, median filter, and adaptive weighted average (AWA) filter.

Two parameters are involved in the filter design, namely, the spatiotemporal filtering support S and the scale factor $\tau$. The support S is usually chosen as 1×1 or 3×3 spatial neighborhood, and 7 or 9 temporally adjacent frames (with R=3,4). As the size of S increases, it helps reduce noise, but tends to blur the images at the same time. So a balance is needed, especially when the motion is not perfect. The scale factor $\tau$ is chosen as $\tau=\sigma_n\sqrt{\sigma_n}$, where $\sigma_n$ is the noise level estimated from module 250. As noise in $\nabla$ increases, the robust function assigns bigger weights to more samples.

Referring to noise estimation 250 in FIG. 2, the noise level $\sigma_n$ is estimated from the difference between the observed video $\nabla$ and the filtered video $\hat{\nabla}$. Similarly a robust method is used to estimate the scale factor $\sigma_d$. The scale factor $\sigma_d(k,k+r)$ used to estimate the motion $U_{ij}(k,k+r)$ from frames k to k+r is computed from the backward motion compensated residue on frame k using the filtered frames. Given noise-free frames and correct motion vectors, the residue should be 0. Otherwise, the residue is mainly due to the random noise and occasional false motion vectors. Let us define the residue as $$\epsilon_d(k,k+r)=\{\bar{I}(i+u_{ij}(k,k+r),j+v_{ij}(k,k+r),k+r)-\bar{I}(i,j,k)|i=1\ldots M,j=1\ldots N,k=1\ldots K, r=-R\ldots R\}.$$

A robust estimate of the scale factor is available as $$\sigma_d(k,k+r)=1.4826\ \text{median}\{|\epsilon_d(k,k+r)-\text{median}\{\epsilon_d(k,k+r)\}|\}$$

The robust video filtering scheme has been tested on video sequences degraded to various noise levels, and significant performance improvement has been achieved. A few factors have contributed to the performance improvement: (a) a robust method is employed in both motion estimation and spatiotemporal filtering to accommodate occasional model violations; (b) a joint motion and noise estimation process is iterated in a closed loop for the best possible performance; and (c) explicit noise estimation is carried out for temporal correlation enhancement and noise reduction.

The method disclosed according to the invention may have a number of distinct applications. For example, the video filtering may used to improve video coding and compression efficiency, due to the reduced entropy. The video filtering may also be used to minimize the storage space for a video clip or to minimize the transmission bandwidth of a video sequence. Furthermore, the video filtering may used to enhance the video presentation quality, in print or in display. Additionally, the video filtering may be used to extract more distinctive and unique descriptions for efficient video management, organization and indexing. In each case, the usage of the aforementioned robust filter designs further enhances the values of these applications.

The invention has been described in detail with particular reference to a presently preferred embodiment, but it will be understood that variations and modifications can be effected within the spirit and scope of the invention.

PARTS LIST

110 System
112 Microprocessor-based Unit
114 Display
116 Keyboard
118 Mouse; input device
120 Selector on display
122 Disc drive unit
124 Compact disc-read only memory
125 External network
126 Floppy disk
128 Printer
130 PC card
132 PC card reader
134 Digital image or video capture device
136 Docking port
138 Cable connection
140 Wireless connection
210 Input video sequence
220 Filtered video sequence
230 Motion compensated video
240 Spatiotemporal filtering module
250 Noise estimation module
260 Motion estimation module
270 Estimated standard deviation
280 Estimated scale factor
310 Initialization step
320 Motion field computation step
330 Motion compensated frames computation step
340 Spatiotemporal filtering step
350 Noise reduction step
360 Noise level and scale factor estimation step
370 Update step
380 termination condition checking step

What is claimed is:

1. A method for video filtering of an input video sequence by utilizing joint motion and noise estimation, said filtering based on determining the noise level, as characterized by the standard deviation, of the input video sequence as corrupted by unknown noise, said method comprising the steps of:
   (a) generating a motion-compensated video sequence from the input video sequence and a plurality of estimated motion fields;
   (b) spatiotemporally filtering the motion compensated video sequence, thereby producing a filtered, motion-compensated video sequence;
   (c) estimating a standard deviation from the difference between the input video sequence and the filtered, motion-compensated video sequence, thereby producing an estimated standard deviation;
   (d) estimating a scale factor from the difference between the input video sequence and the motion compensated video sequence; and
   (e) iterating through steps (a) to (d) using the scale factor previously obtained from step (d) to generate the motion-compensated video sequence in step (a) and using the estimated standard deviation previously obtained from step (c) to perform the filtering in step (b) until the value of the noise level approaches the unknown noise of the input video sequence, whereby the noise level is then characterized by a finally determined scale factor and standard deviation.

2. The method of claim 1 wherein step (a) comprises generating the estimated motion fields between temporally adjacent frames of the filtered, motion-compensated video sequence, and using the estimated motion fields to generate the motion-compensated video sequence from the input video sequence.

3. The method of claim 1 wherein the iterations in step (e) are carried out until the change in estimated noise level is less than a predetermined threshold.

4. The method of claim 1 wherein the iterations in step (e) are carried out until a predetermined number of iterations has been reached.

5. The method of claim 1 wherein step (a) employs motion estimation and compensation to establish temporal trajectories of moving points and enhance temporal correlation between points across frames.

6. The method of claim 1 wherein the spatiotemporal filtering of step (b) reduces random noise independent of video structure.

7. The method of claim 1 wherein a robust filter design is used for the motion estimation performed in step (a).

8. The method of claim 7 wherein the robust filter design for the motion estimation uses the scale factor to control the transition between inliers and outliers.

9. The method of claim 7 wherein the robust filter design includes is a Geman-McClure function.

10. The method of claim 1 wherein a robust filter design is used for spatiotemporal filtering performed in step (b).

11. The method of claim 10 wherein the filter design employs the noise characteristics from noise estimation.

12. The method of claim 1 wherein the video filtering is used to improve video coding and compression efficiency, due to a reduced entropy.

13. The method of claim 1 wherein the video filtering is used to minimize the storage space for a video clip.

14. The method of claim 1 wherein the video filtering is used to minimize the transmission bandwidth of a video sequence.

15. The method of claim 1 wherein the video filtering is used to enhance the video presentation quality, in print or in display.

16. The method of claim 1 wherein the video filtering is used to extract more distinctive and unique descriptions for efficient video management, organization and indexing.

17. A computer readable medium having a stored computer program therein for causing a computer to perform the method of claim 1.

18. Apparatus for video filtering of an input video sequence by utilizing joint motion and noise estimation, said filtering based on determining the noise level, as characterized by the standard deviation, of the input video sequence as corrupted by unknown noise, said apparatus comprising:

a motion filtering module for generating a motion-compensated video sequence from the input video sequence and a plurality of estimated motion fields;

a spatiotemporally filtering module for processing the motion compensated video sequence, thereby producing a filtered, motion-compensated video sequence;

a noise estimation module for (a) estimating a standard deviation from the difference between the input video sequence and the filtered, motion-compensated video sequence, thereby producing an estimated standard deviation, and (b) estimating a scale factor from the difference between the input video sequence and the motion compensated video sequence; and means interconnecting the motion estimation module, the spatiotemporally filtering module and the noise estimation module for iterating the sequences therebetween using the scale factor previously obtained from the noise estimation module to generate the motion-compensated video sequence and using the estimated standard deviation previously obtained from the noise estimation module to perform the spatiotemporally filtering until the value of the noise level approaches the unknown noise of the input video sequence, whereby the noise level is then characterized by a finally determined scale factor and standard deviation.

* * * * *